No. 672,591. Patented Apr. 23, 1901.
C. F. CHRIST.
MACHINE FOR UNLOADING MATCHES.
(Application filed Dec. 7, 1900.)
(No Model.)
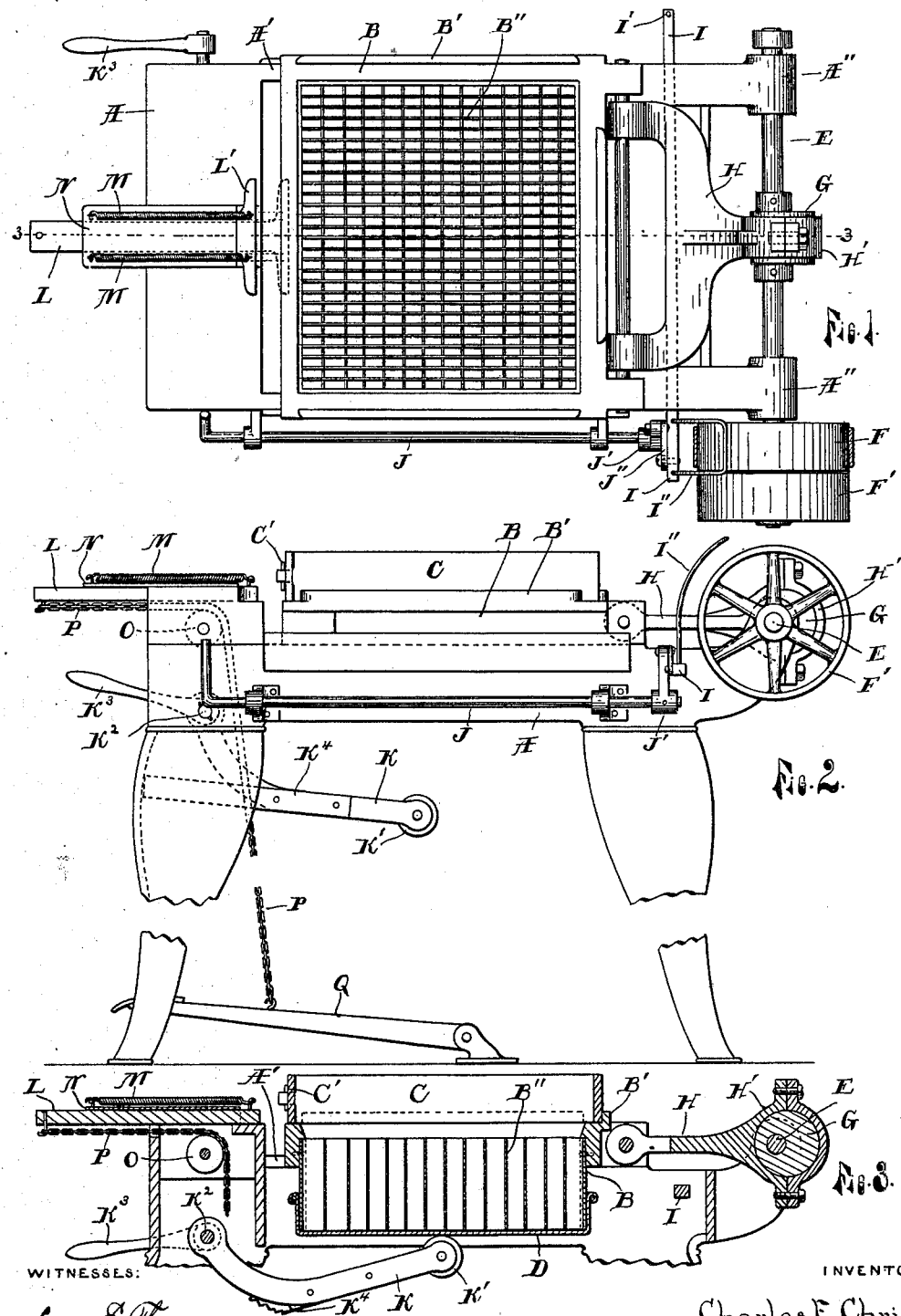

UNITED STATES PATENT OFFICE.

CHARLES F. CHRIST, OF DETROIT, MICHIGAN.

MACHINE FOR UNLOADING MATCHES.

SPECIFICATION forming part of Letters Patent No. 672,591, dated April 23, 1901.

Application filed December 7, 1900. Serial No. 38,994. (No model.)

*To all whom it may concern:*

Be it known that I, CHARLES F. CHRIST, a citizen of the United States of America, residing at Detroit, in the county of Wayne and State of Michigan, have invented certain new and useful Improvements in Machines for Unloading Matches, of which the following is a specification, reference being had therein to the accompanying drawings.

My invention relates to machines employed in the manufacture of matches for receiving matches from the dipping-frames and arranging them in suitable receptacles in a manner to facilitate the packing of the same in boxes, thus avoiding the necessity of arranging the matches by hand, with the consequent danger from ignition and injury to the health of the workman.

My invention consists in the peculiar construction and arrangement of the hopper for receiving the matches from the dipping-frames and the receptacle into which they are discharged from the hopper, together with the operating mechanism for both, whereby the matches are arranged perpendicularly in a removable receptacle or pan, from which they may be readily removed and placed in boxes, all as hereinafter more fully described, and particularly pointed out in the claims, reference being had to the accompanying drawings, in which—

Figure 1 is a plan view of a device embodying my invention. Fig. 2 is a side elevation of the same. Fig. 3 is a longitudinal vertical section on the lines 3 3 of Fig. 1.

Like letters refer to like parts in all of the figures.

A is the frame of the machine, having ways A' formed on its upper surface, in which ways the hopper-box B is longitudinally movable. Ribs B' are formed on the upper edges of the hopper B to engage and hold in place thereon a dipping-frame C, and within said hopper and arranged both longitudinally and transversely thereof are division-walls B", extending from near the top of said hopper B to its bottom. The walls of the lower end of the hopper B are reduced in thickness, and a pan or receptacle D is provided, which is adapted to be placed over said reduced end to close the same and receive the matches.

To reciprocate the hopper B in the ways A', a shaft E is journaled in bearings A" in the frame A, which shaft is provided with a loose and tight pulley F and F', and upon which shaft is secured the eccentric G, said eccentric being connected to the hopper by means of the yoke H, pivoted at one end to said hopper and having an eccentric-strap H' at the opposite end embracing said eccentric. A shift-bar I extends transversely of the frame A and is longitudinally movable in openings therein, said bar being provided at one end with a stop-pin I' and at the opposite end with upwardly-extended fingers I", adapted to engage the edges of the driving-belt and shift the same from one of said pulleys to the other. To operate this bar I, a rod J is journaled in bearings secured to the frame A and bent at right angles near one end to form a lever to turn the same. To the opposite end of said rod J is secured a crank-arm J', and a connecting-link J" connects said crank-arm and the end of said bar I.

To hold the pan D over the end of the hopper B when said hopper is in motion, arms K are provided, having rolls K' at one end to engage the under side of the pan and are secured at their opposite ends to a rock-shaft $K^2$, which shaft is journaled on the frame A and provided with a handle $K^3$ to operate the same. Stops $K^4$, adapted to abut against the legs of the frame and limit the downward movement of the arms K, are secured to said arms.

The dipping-frame C is of the ordinary construction, the matches being held therein by compression and released by removing the pins C', which hold the side in contact with the contents. To release these pins, I provide a plunger L, having a head L' and adapted to move longitudinally in a way provided therefor in the frame A against the action of the coiled springs M, which springs are attached to said head L' at one end and to a plate N at their opposite ends, said plate being bolted to the frame over the way for said plunger L to hold the same therein. Journaled in the frame A, beneath the bar L, is a roll O, over which passes a chain P, which chain is attached at one end to the outer end of the bar L and at its opposite end to a treadle Q.

The operation of my device is as follows:

The dipping-frame C, full of matches, is first placed in position on the hopper B, with the side having the pins C' toward the plunger L, which plunger is forced longitudinally against said frame side by operating the treadle Q with sufficient force to remove the pressure against the pins C', when they may be removed and the matches released, the pan D being placed over the lower end of the hopper B and held in place by moving the handle $K^3$ until the roll K' engages the bottom of the pan. The machine is then put in motion by shifting the driving-belt to the tight pulley, and the eccentric G causes the hopper B to reciprocate, carrying with it the frame C and pan D. This vibration causes the matches to drop endwise from the dipping-frame into the compartments of the hopper, which compartments are of such size that the matches cannot assume a horizontal position, but must stand vertically therein. When the vibrations of the hopper have caused all the matches to stand side by side in the compartments, with their lower ends resting on the bottom of the pan D, the machine is stopped, the handle $K^3$ released, and the pan lowered. The matches are lowered with the pan and rest on their ends within the same.

Having thus fully described my invention, what I claim is—

1. In a machine for the purpose described, in combination with the frame thereof and a vibrating hopper supported thereon to receive the matches; a receptacle to embrace the lower end of said hopper and movable therewith, and an arm pivoted on said frame at one end and provided at its opposite end with a roll adapted to engage the bottom of the receptacle to hold the same in engagement with the hopper, and to be lowered to release said receptacle when said arm is turned on its pivot.

2. In a machine for the purpose described, a frame having ways, a hopper longitudinally movable in said ways, a receptacle embracing the lower end of said hopper and adapted to move therewith, a rock-shaft journaled in said frame, an arm on said rock-shaft adapted to engage the under side of said receptacle, a stop on said arm, and a lever to operate said rock-shaft.

3. In a machine for the purpose described, a frame provided with ways, a hopper mounted on said ways, ribs on the upper end of said hopper to engage a dipping-frame, longitudinal and transverse partition-walls consisting of thin sheets of metal, placed vertically within said hopper and transversely of each other and dividing the hopper into vertical compartments open at the top and bottom and of such dimensions in cross-section, that the matches can enter only in an endwise position, a detachable receptacle having vertical sides to embrace and engage the lower end of said hopper, and a bottom to close the lower ends of said compartments, said sides being adapted to hold the matches in an upright position when said receptacle is detached from the hopper, a rock-shaft journaled on said frame, arms on said rock-shaft, rolls on said arms to engage the receptacle, stops to limit the movement of said arms, a handle to operate said rock-shaft and hold the rolls in engagement with the receptacle; a shaft journaled on the frame, an eccentric on said shaft, and a ring embracing said eccentric and connected to the hopper.

4. In a machine for the purpose described, having a hopper provided with ribs on its upper end to engage a collapsible dipping-frame, and means for compressing said frame consisting of a plunger-bar L longitudinally movable in a way, a plate N secured over said way, springs M secured at one end to said plate and at the opposite end to said plunger, a roll O beneath said plunger, a treadle Q, and a rope or chain P passing over said roll and secured at its ends to said plunger and treadle.

5. In a machine for the purpose described, a frame provided with ways, a hopper longitudinally movable in said ways and having a reduced lower end, ribs on the upper end of said hopper to engage a dipping-frame, longitudinal and transverse walls in said hopper forming vertical compartments, a receptacle having a bottom to close the lower ends of said compartments and sides to embrace the reduced end of the hopper, a rock-shaft journaled in the frame, arms on said rock-shaft having rolls to engage the under side of the receptacle, a driving-shaft mounted in bearings on the frame, an eccentric on the driving-shaft, a yoke pivoted to the hopper and having a ring embracing the eccentric, a tight and loose pulley on the driving-shaft, a shift-bar mounted on the frame, fingers on said shift-bar, and a rod journaled on the frame and bent at right angles near one end to form a lever, and provided at the other end with a crank-arm connected to the shift-bar.

In testimony whereof I affix my signature in presence of two witnesses.

CHARLES F. CHRIST.

Witnesses:
OTTO F. BARTHEL,
JOSEPH A. NOELKE.